Patented Jan. 30, 1945

2,368,222

UNITED STATES PATENT OFFICE 2,368,222

CYANINE DYESTUFF INTERMEDIATES

John David Kendall, Harold Gordon Suggate, and Henry Walter Wood, Ilford, England, assignors to Ilford Limited, Ilford, England, a British company No Drawing. Application January 8, 1942, Serial No. 426,097. In Great Britain January 17, 1941

10 Claims. (Cl. 260—298)

This invention relates to the production of new organic compounds and particularly to the production of new organic compounds which are valuable intermediates in the production of dyestuffs, particularly photographic sensitising dyestuffs.

According to this invention, new organic compounds are produced by condensing a compound of the general Fomula I

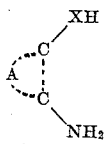

where X is an oxygen atom, a sulphur atom or a selenium atom and A is the residue of a substituted or unsubstituted mono- or poly-carbocyclic nucleus, or a metal salt of such compound, with an acid of the general Formula II

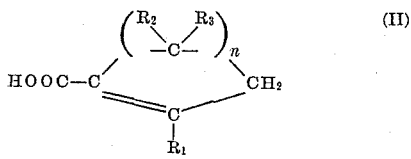

where $R_1$, $R_2$ and $R_3$ are the same or different and are hydrogen atoms or hydrocarbon groups, e. g., alkyl, aryl or aralkyl groups and $n$ is a positive integer greater than 1, e. g., 2 or 3, or with an anhydride or acid halide of such acid.

In this condensation ring closure takes place to yield a product of the general Formula III

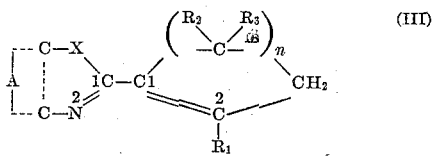

It has been discovered that in these compounds the $CH_2$ group shewn at the right-hand end of general Formula III is reactive and that the compounds may be condensed with other compounds as set forth in co-pending application No. 426,098, filed January 8, 1942, to form dyestuffs especially valuable for sensitising silver halide photographic emulsions.

The compound of general Formula I may be a simple benzene derivative, i. e., 1-hydroxy-2-amino benzene, 1-mercapto-2-amino benzene or 1-seleno-mercapto-2-amino benzene or the benzene ring of such compounds may be additionally substituted, e. g., by halogen atoms, or alkyl, aryl, substituted aryl, aralkyl, substituted aralkyl, amino, substituted amino, alkoxy, aryloxy or carboxylic groups. Or, again, the benzene ring may have one or more other benzene rings fused to it, as in the corresponding naphthalene, anthracene and phenanthrene compounds. As already indicated, the compounds may be used in the form of their metal salts, e. g., sodium salts or zinc salts.

The compounds of general Formula II may be $\Delta^1$-cyclopentene carboxylic acid, $\Delta^1$-cyclohexene carboxylic acid or a higher homologous acid of this series, or as indicated above, the corresponding acid anhydrides or acid halides, e. g., acid chlorides may be employed. As stated above, the groups $R_1$, $R_2$ and $R_3$ may be alkyl, aryl or aralkyl groups, e. g., methyl, ethyl, propyl and higher alkyl groups, benzyl and naphthylmethyl groups and phenyl, naphthyl and homologous aryl groups.

$\Delta^1$-cyclopentene carboxylic acid may conveniently be prepared by reacting cyclopentanone with potassium cyanide and hydrochloric acid under ice-cold conditions to produce cyclopentenyl cyanhydrin, treating this with phosphorus pentoxide in benzene to yield the corresponding nitrile and hydrolysing the nitrile by treatment with caustic potash. The corresponding anhydride may be prepared by heating the acid with acetic anhydride.

$\Delta^1$-cyclohexene carboxylic acid and the corresponding anhydride, and higher homologues of this series, may be prepared by similar methods.

The following examples illustrate the invention but are not to be regarded as limiting it in any way:

EXAMPLE I $1-(\Delta^1)$-cyclopentenyl-benzoxazole

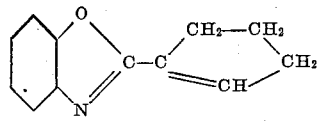

10 gms. of $\Delta^1$-cyclopentene monocarboxylic acid anhydride and 8 gms. of o-amino-phenol were mixed and gently boiled under a reflux condenser for one hour. The mixture was then distilled at normal pressure and a fraction collected boiling between 200° C. and 270° C. This fraction solidified in the condenser. The solid material was dissolved in ether and the ether solution was washed with dilute sodium carbonate solution followed by washing with water and was then dried over anhydrous potassium carbonate. The ether was then removed by evaporation and the residue re-distilled at 12 mm. pressure. The product was thus obtained as a light brown solid, melting at 80–84° C. and boiling at 166–170° C. at 12 mm. pressure.

EXAMPLE II 1-($\Delta^1$)-cyclohexenyl benzoxazole

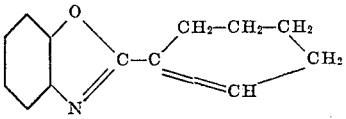

22 gms. of $\Delta^1$-cyclohexenyl monocarboxylic acid anhydride and 7.5 gms. of o-amino phenol were mixed together and the mixture slowly distilled. A fraction boiling between 230° C. and 260° C. was collected, and this largely consisted of cyclohexene carboxylic acid. A further fraction was collected, boiling between 260° C. and 300° C. This latter fraction was dissolved in ether and the ether solution washed, first with sodium carbonate solution and then with water, and then dried over anhydrous sodium sulphate. The ether was removed by distillation and the residue re-distilled at 20 mm. pressure. The product was thus obtained as an oil, boiling at 182° C./20 mm. which solidified on cooling. The solid product had a melting point of 58° C.

EXAMPLE III 1-($\Delta^1$)-cyclohexenyl benzthiazole

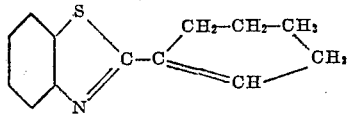

28.5 gms. of $\Delta^1$-cyclohexenyl monocarboxylic acid anhydride was mixed with 15 gms. of o-aminothiophenol and the mixture slowly distilled. A fraction boiling at 230–260° C. was first collected and this largely consisted of cyclohexene carboxylic acid. A further fraction boiling between 260–350° C. was collected, and this was dissolved in ether. The ether solution was washed with dilute sodium carbonate solution and then with water and was then dried over anhydrous sodium sulphate. The ether was removed by distillation and the residue re-distilled under reduced pressure. The product was thus obtained as an oil boiling at 200–210° C./10 mm.

EXAMPLE IV

4:5-dimethyl-1-($\Delta^1$)-cyclopentenyl benzoxazole

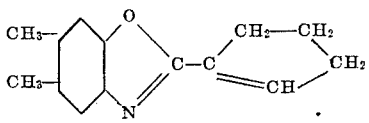

13 gms. of $\Delta^1$-cyclopentenyl carboxylic acid anhydride and 16.1 gms. of 2-amino-4:5-dimethyl phenol were mixed together and heated at a gentle boil for one hour. The product was distilled at normal pressure and the fraction boiling at 305–310° C. was collected. This fraction consisted of the crude product, which may be purified, or used in the crude state for further condensations to produce dyestuffs.

EXAMPLE V 1-($\Delta^1$)-cyclopentenyl benzthiazole

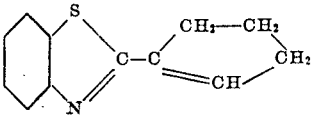

14 gms. of $\Delta^1$-cyclopentene mono-carboxylic acid anhydride was slowly added to 12 gms. of o-amino-thiophenol, whereupon vigorous reaction took place. The resulting black viscous liquor was boiled for 1½ hours and then distilled at normal pressure, the fraction distilling at 250–320° C. being collected. This fraction was then re-distilled at 20 mm. pressure and the desired product was obtained as the fraction boiling at 207–220° C./20 mm.

EXAMPLE VI 1-($\Delta^1$)-cyclohexenyl benzselenazole

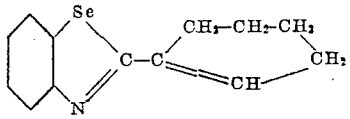

15.5 gms. of zinc o-amino selenophenate were suspended in 50 ccs. of dry ethyl acetate and treated with 12.0 gms. of $\Delta^1$-cyclohexene monocarboxylic acid chloride. A vigorous reaction took place and a pasty mass was formed. After refluxing for a further 15 minutes, the ethyl acetate was allowed to evaporate. The residue was ground repeatedly with water and ether and the combined ether extracts were washed with water and dried. After removal of the ether the solid product was obtained. It boiled at 180–210° C. at 20 mm. pressure and had a melting point of 55° C.

The compounds of the foregoing examples all conform to the generic Formula III and are numbered as indicated in that formula.

What we claim is:

1. Process for the manufacture of dyestuff intermediates which comprises condensing a compound selected from the class consisting of compounds of the general formula:

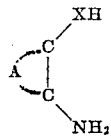

(where X is an atom selected from the class consisting of the oxygen, sulphur and selenium atoms, and A constitutes the atoms necessary to complete a benzene ring with the two carbon atoms attached respectively to the XH and NH$_2$ groups and form an aromatic hydrocarbon nucleus), and metal salts thereof, with a compound selected from the group consisting of $\Delta^1$-cyclopentene monocarboxylic acid and its anhydride and acid chloride.

2. Process for the manufacture of dyestuff intermediates which comprises condensing a compound selected from the class consisting of compounds of the general formula:

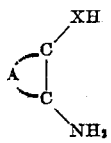

(where X is an atom selected from the class consisting of the oxygen, sulphur and selenium atoms, and A constitutes the atoms necessary to complete a benzene ring with the two carbon atoms attached respectively to the XH and NH$_2$ groups and form an aromatic hydrocarbon nucleus), and metal salts thereof, with a compound selected from the group consisting of $\Delta^1$-cyclohexene mono-carboxylic acid and its anhydride and acid chloride.

3. Process for the manufacture of dyestuff intermediates which comprises condensing a compound selected from the class consisting of o-amino-phenol, o-amino-thiophenol and o-amino-seleno-phenol and metal salts thereof with $\Delta^1$-cyclopentene monocarboxylic acid anhydride.

4. Process for the manufacture of dyestuff intermediates which comprises condensing a compound selected from the class consisting of o-amino-phenol, o-amino-thiophenol and o-amino-seleno-phenol and metal salts thereof with $\Delta^1$-cyclohexene monocarboxylic acid anhydride.

5. Dyestuff intermediates of the general formula:

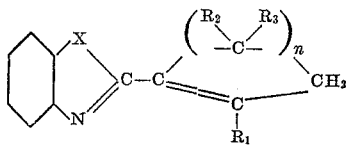

where X is an atom selected from the class consisting of the oxygen, sulphur and selenium atoms, R$_1$, R$_2$ and R$_3$ are selected from the class consisting of hydrogen atoms and hydrocarbon groups and $n$ is a positive integer from 2 to 3.

6. Dyestuff intermediates of the general formula:

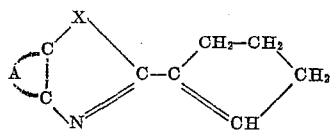

where X is an atom selected from the class consisting of the oxygen, sulphur and selenium atoms, and A constitutes the atoms necessary to complete a benzene ring with the two carbon atoms attached to X and N, respectively, and form an aromatic hydrocarbon nucleus.

7. Dyestuff intermediates of the general formula:

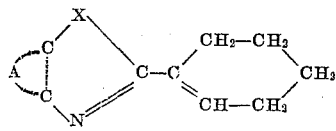

where X is an atom selected from the class consisting of the oxygen, sulphur and selenium atoms, and A constitutes the atoms necessary to complete a benzene ring with the two carbon atoms attached to X and N, respectively, and form an aromatic hydrocarbon nucleus.

8. Process for the manufacture of dyestuff intermediates which comprises condensing a compound selected from the class consisting of compounds of the general formula:

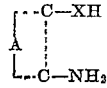

wherein X is an atom selected from the group consisting of oxygen, sulfur, and selenium atoms and A constitutes the atoms necessary to complete a benzene ring with the two carbon atoms attached respectively to the XH and NH groups and form an aromatic hydrocarbon nucleus, and metal salts thereof; with a compound selected from the class consisting of acids of the general formula:

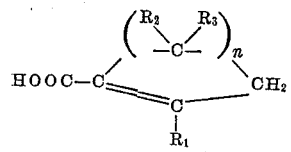

and anhydrides and acid halides of such acids wherein R$_1$ and R$_2$ and R$_3$ are selected from the group consisting of hydrogen atoms and monovalent hydrocarbon groups and $n$ is a whole number from 2 to 3.

9. Process for the manufacture of dyestuff intermediates which comprises condensing a compound selected from the class consisting of compounds of the general formula:

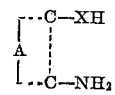

wherein X is an atom selected from the group consisting of oxygen, sulfur, and selenium atoms and A constitutes the atoms necessary to complete a benzene ring with the two carbon atoms attached respectively to the XH and NH groups, and metal salts thereof; with a compound selected from the class consisting of acids of the general formula:

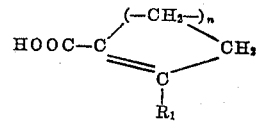

and anhydrides and acid halides of such acids wherein R$_1$ is selected from the group consisting of hydrogen atoms and hydrocarbon groups and $n$ is a whole number from 2 to 3.

10. Dyestuff intermediates of the general formula:

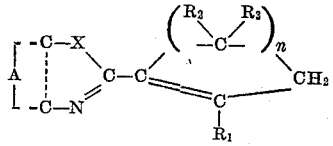

wherein X is an atom selected from the group consisting of oxygen, sulfur, and selenium atoms and A constitutes the atoms necessary to complete a benzene ring with the two carbon atoms attached to X and N, respectively, and form an aromatic hydrocarbon nucleus, R$_1$, R$_2$, and R$_3$ are selected from the group consisting of hydrogen atoms and hydrocarbon groups and $n$ is a whole number from 2 to 3.

JOHN DAVID KENDALL.
HAROLD GORDON SUGGATE.
HENRY WALTER WOOD.